June 9, 1959 G. MUFFLY 2,890,345

METHOD OF CONVERTING MAGNETIC RECORDINGS TO VISUAL IMAGES BY USE OF RADIOACTIVE MAGNETIC MATERIALS

Filed March 6, 1956

INVENTOR
GARY MUFFLY,

BY Horace B. Cooke
ATTORNEY

United States Patent Office 2,890,345

Patented June 9, 1959

2,890,345

METHOD OF CONVERTING MAGNETIC RECORDINGS TO VISUAL IMAGES BY USE OF RADIOACTIVE MAGNETIC MATERIALS

Gary Muffly, Oakmont, Pa., assignor to Gulf Research & Development Company, Pittsburgh, Pa., a corporation of Delaware Application March 6, 1956, Serial No. 569,878

4 Claims. (Cl. 250—65)

This invention relates to the reproduction of magnetic records and particularly to the duplication or copying of magnetic records on a background to facilitate viewing or further reproduction.

In recent years the recording of sound on magnetic record mediums such as tapes or films has become popular because of the superior performance of magnetic records. This widespread use of magnetic records has presented the problem of duplicating or copying the record. In the past copies of magnetic sound records have been produced by re-recording or by photographic copying. In photographic copying methods special techniques are employed to make a magnetic powder adhere to the magnetized portions of the records as magnetic recordings are not ordinarily visible. However, these powder techniques make a visible record which has low contrast and which is not easily copied. The duplication of magnetic records by re-recording with oscillographs of various types is not entirely satisfactory as these methods are quite expensive and time-consuming.

In the use of magnetic sound recording it is often desirable to have visual reproductions of the recording. In this way the recorded intelligence can be easily viewed and compared with other recordings and the like. Visual reproductions have found special utility in seismograph work where variable density recordings are utilized.

I have now discovered a method of producing duplicate copies of a magnetic record to obtain visible prints. In accordance with my discovery, there is adhered to the magnetic portions of a magnetic record a material which is both magnetic and radioactive, a photosensitive emulsion is then exposed to the resulting record and a print is developed from the exposed emulsion.

The invention will be better understood by referring to the following description read in conjunction with the accompanying drawings forming a part hereof in which, Figure 1 is a view of section of a magnetic film or tape embodying the invention;

In brief, the method of the invention is carried out by depositing finely divided particles of a material which is both magnetic and radioactive on a magnetic record, the powder preferably being fixedly adhered to the magnetized portion of the record by use of a suitable binder. The emulsion side of a sensitized photographic film or paper is then exposed to the powdered side of the record for a suitable exposure period, and the resulting print is then developed in any suitable manner known to the art.

In carrying out the present invention the radioactive powder employed is selected from a wide variety of magnetic materials such as oxides of iron, ferrites, or alloys which contain iron, cobalt or nickel in their composition. The metals, iron, cobalt and nickel have radioactive forms. Zinc and manganese which are contained in many ferrites also have radioactive forms.

The selected magnetic material is prepared in the desired form or particle size, for example, by grinding, decomposition of suitable compounds thereof, and the like, and then subjected to neutron bombardment in a nuclear reactor or other source of neutrons to produce radioactivity. The particle size of the magnetic and radioactive material is not critical but for best results it is preferred to employ a particle size of about 10 microns or less.

Figure 1:
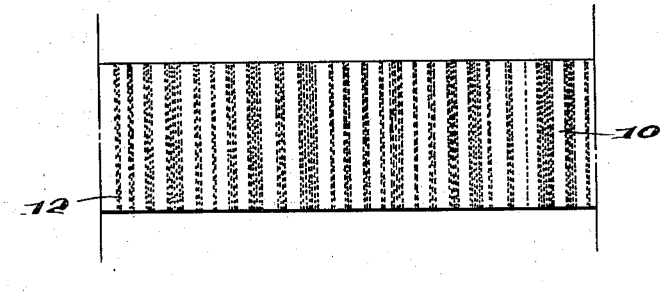
Figure 2:
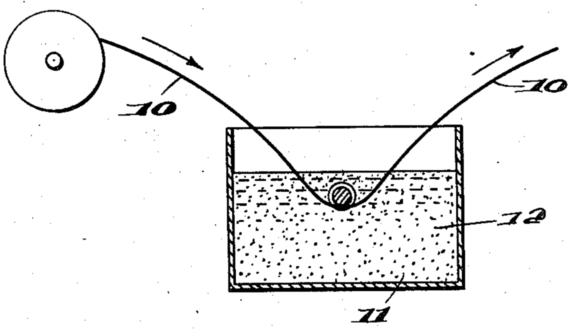
Figure 2 is a diagrammatic view of one modification of the invention.

In the embodiment of the invention illustrated in Figure 2 the radioactive magnetic powder is suspended in a liquid binder material, such as dilute solution of shellac in alcohol which is preferably agitated to maintain the suspension by stirring, shaking or the motion of the tape itself. Other binder materials such as drying oils, plasticized cellulose esters and ethers, polyacrylate resins, polyvinyl resins and any other known flexible film-forming organic material which is soluble in suitable organic solvents are suitable for the purposes of this invention provided that they are selected so as not to attack the magnetic coating or the tape itself.

The magnetic record 10 which is to be reproduced is passed through the binder solution 11 containing the suspended radioactive magnetic particles 12, whereby the particles are attracted to the magnetized portions of the record. The amount and distribution of the magnetic particles adhering to the magnetized portions of the record will be in accordance with the variations in intensity of the magnetism in the original record. The binder upon drying will prevent the radioactive particles from being rubbed off easily and will maintain the particles in the true magnetic pattern of the original record.

After the binder has dried, the powdered side, i.e., the side of the record to which the magnetic particles adhere is brought, in darkness of course, into contact with a sensitized photographic medium to expose the latter to the record. In one instance, this can be done by pressing the powdered side of the record against the emulsion side of a sensitized photographic film or paper for a suitable exposure period and then developing and fixing the resulting print in a manner known to the art. The radiation from the radioactive particles will expose the photographic emulsion according to the pattern of the original record to produce the desired copy.

Figure 3:
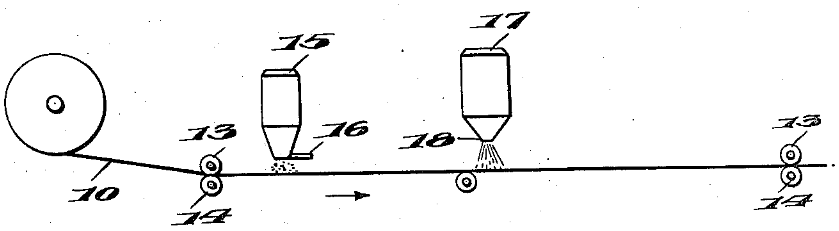
Figure 3 is a diagrammatic view of a second modification of the invention.

Referring to Figure 3 an alternative method of depositing the radioactive magnetic powder on the recording is shown. The magnetic tape 10 on which the original record is recorded is adapted to be advanced in any suitable manner over a plurality of rollers 13 and 14. The tape passes under container 15 containing the radioactive magnetic particles which are to be deposited on the tape. The bottom of the container 15 is provided with a valve which is opened and closed by a slide 16 whereby a stream of dry radioactive magnetic particles is deposited on the moving tape. Mechanical agitation or a gentle air current can be used to advantage to cause particles to disperse and reach all parts of the tape and to move on if they strike only non-magnetized portions. Any powder not adhering magnetically to the record is then removed. The tape then passes under a container 17 which holds a solution of a suitable binder. The bottom of container 17 is provided with a nozzle 18 whereby the binder solution is gently sprayed on the advancing tape adhesively to fix the particles to the tape.

The invention is further illustrated by the following example.

An iron powder of 2 to 20 microns particle size obtained commercially from iron penta-carbonyl is bombarded for several weeks to produce iron 55 which is radioactive, emitting soft gamma rays, with a half-life of 2.9 years. The powder is suspended in a dilute solution of shellac in alcohol, and the magnetic record is passed slowly through the solution causing the magnetic particles in the solution to be attracted and adhere to the magnetized portions of the record. After sufficient time has elapsed for the shellac solution to dry, the powdered side of the recording is contacted with the emulsion side of a sensitized photographic film or paper and allowed to remain for a suitable exposure time. The resulting print is then developed by methods well known in the photographic art.

From the foregoing description of the invention it is apparent that this invention provides a convenient method for making permanent visible reproductions of magnetic records, the viewing of which is thereby greatly facilitated.

Resort may be had to such modifications and variations which fall within the spirit of the invention and the scope of the appended claims.

Having thus set forth the nature of my invention, I claim:

1. The method of reproducing copies of a magnetic record which comprises adhering to the magnetic portions of said record a radioactive magnetic material, then exposing a photosensitive emulsion to said record, and developing the resulting print.

2. The method of reproducing copies of a magnetic record which comprises depositing finely divided particles of a radioactive, magnetic material on a magnetic record, depositing a binder material on said particles adhesively to fix said particles to the magnetized portion of the record, exposing the emulsion side of a photographic film to the side of the magnetic record to which the said particles adhere, and developing the resulting print.

3. The method of reproducing copies of a magnetic record which comprises suspending finely divided particles of a radioactive, magnetic material in a liquid binding agent, passing the magnetic record through the said liquid binding agent so that said particles adhere to the magnetized portion of the record, drying the binder, exposing the emulsion side of a photographic film to the side of the magnetic record to which the said particles adhere, and developing the resulting print.

4. The method of reproducing copies of a magnetic record which comprises depositing dry finely divided particles of a radioactive, magnetic material on a magnetic record, then depositing a binder on said particles adhesively to fix said particles to the magnetized portion of the record, exposing the emulsion side of a photographic film to the side of the magnetic record to which the said particles adhere, and developing the resulting print.

References Cited in the file of this patent

UNITED STATES PATENTS

| | | |
|---|---|---|
| 1,815,010 | Pollock et al. | July 14, 1931 |
| 2,699,408 | Gamras | Jan. 11, 1955 |

OTHER REFERENCES

National Lithographer, October 1934, page 25. (Copy in 95 (processes).)